(12) United States Patent
Rozen et al.

(10) Patent No.: US 7,975,155 B2
(45) Date of Patent: Jul. 5, 2011

(54) APPARATUS AND METHOD FOR CONTROLLING VOLTAGE AND FREQUENCY

(75) Inventors: Anton Rozen, Gedera (IL); Boris Bobrov, Austin, TX (US); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 519 days.

(21) Appl. No.: 11/575,002

(22) PCT Filed: Sep. 10, 2004

(86) PCT No.: PCT/IB2004/004473
§ 371 (c)(1),
(2), (4) Date: Nov. 17, 2008

(87) PCT Pub. No.: WO2006/056824
PCT Pub. Date: Jun. 1, 2006

(65) Prior Publication Data
US 2009/0144572 A1    Jun. 4, 2009

(51) Int. Cl.
*G06F 1/26* (2006.01)
*G06F 1/32* (2006.01)

(52) U.S. Cl. ........ 713/322; 713/300; 713/320; 713/321; 700/295; 700/297

(58) Field of Classification Search ............. 713/300, 713/320, 321, 322; 700/295, 297
See application file for complete search history.

(56) References Cited

U.S. PATENT DOCUMENTS

| 6,192,479 | B1 | 2/2001 | Ko |
| 6,574,739 | B1 | 6/2003 | Kung et al. |
| 6,584,571 | B1 | 6/2003 | Fung |
| 7,058,824 | B2* | 6/2006 | Plante et al. .................. 713/300 |
| 7,360,100 | B2* | 4/2008 | Allred et al. .................. 713/300 |
| 2002/0099964 | A1 | 7/2002 | Zdravkovic |
| 2002/0133729 | A1* | 9/2002 | Therien et al. ............... 713/330 |
| 2003/0110423 | A1 | 6/2003 | Helms et al. |
| 2003/0125900 | A1 | 7/2003 | Orenstein et al. |
| 2005/0044429 | A1 | 2/2005 | Gaskins et al. |
| 2008/0141047 | A1* | 6/2008 | Riviere-Cazaux ............ 713/300 |

FOREIGN PATENT DOCUMENTS

WO    02/074046 A2    9/2002

OTHER PUBLICATIONS

Govil et al; "Comparing Algorithms for Dynamic Speed-Setting of a Low-Power CPU"; International Computer Science Institute, Berkeley, CA, Apr. 1995.
Non-Final Office Action mailed Apr. 15, 2010 for U.S. Appl. No. 11/575,004, 13 pages.
Final Office Action mailed Oct. 25, 2010 for U.S. Appl. No. 11/575,004, 12 pages.

* cited by examiner

Primary Examiner — Thomas Lee
Assistant Examiner — Michael J Brown

(57) ABSTRACT

A method and an apparatus for controlling voltage level and clock signal frequency supplied to a system. The apparatus includes a hardware module, adapted to receive at least one indication of a load of the system and to determine a voltage level and a clock signal frequency to be provided to the system, and a software module, adapted to configure a voltage source and a clock signal source in response to the determination. The method includes: (i) receiving, at a hardware module, indication of a load of a system; (ii) determining, by the hardware module, a voltage level and a clock signal frequency to be provided to the system; and (iii) configuring, by a software module, a voltage source and a clock signal source in response to the determination.

16 Claims, 2 Drawing Sheets

APPARATUS AND METHOD FOR CONTROLLING VOLTAGE AND FREQUENCY

FIELD OF THE INVENTION

The present invention relates to apparatuses and methods for controlling supply voltage and clock signal frequency within a processor based device and.

BACKGROUND OF THE INVENTION

Mobile devices, such as but not limited to personal data appliances, cellular phones, radios, pagers, lap top computers, and the like are required to operate for relatively long periods before being recharged. These mobile devices usually include one or more processors as well as multiple memory modules and other peripheral devices.

In order to reduce the power consumption of mobile devices various power consumption control techniques were suggested. A first technique includes reducing the clock frequency of the mobile device. A second technique is known as dynamic voltage scaling (DVS) or alternatively is known as dynamic voltage and frequency scaling (DVFS) and includes altering the voltage that is supplied to a processor as well as altering the frequency of a clock signal that is provided to the processor in response to the computational load demands (also referred to as throughput) of the processor. Higher voltage levels are associated with higher operating frequencies and higher computational load but are also associated with higher energy consumption.

DVS can be implemented by software. A disadvantage of software based application results from timing issues and the computational load that an execution of such software imposes on a processor.

DVS can also be implemented by hardware. A disadvantage of hardware-based solution resides on their inflexibility and complexity.

Various DVS systems and method are provided at U.S. Pat. No. 6,584,571 of Fung, titled "system and method of computer operating mode clock control for power consumption reduction", U.S. Pat. No. 6,079,025 of Fung titled "system and method of computer operating mode control for power consumption reduction", U.S. patent application 20020042887 of Chauvel et al., titled "Dynamic hardware configuration for energy management systems using task attributes", all being incorporated herein by reference.

There is a need to provide a trade off between software and hardware based DVS apparatuses.

SUMMARY OF THE PRESENT INVENTION

The invention provides a method and an apparatus for controlling voltage level and clock signal frequency supplied to a system. The apparatus includes a hardware module, adapted to receive at least one activity related signal representative of an activity of at least one component of the system and to determine a voltage level and a clock signal frequency to be provided to the system, and a software module, adapted to configure a voltage source and a clock signal source in response to the determination.

BRIEF DESCRIPTION OF THE DRAWINGS

The present invention will be understood and appreciated more fully from the following detailed description taken in conjunction with the drawings in which:

FIG. 4 is a flow chart of a method for

DETAILED DESCRIPTION OF PREFERRED EMBODIMENTS

The following description related to a system that includes a single frequency region. It is noted that this can be applied to a system that includes multiple frequency regions. Typically, multiple frequency regions require separate control for each frequency region.

Figure 1:
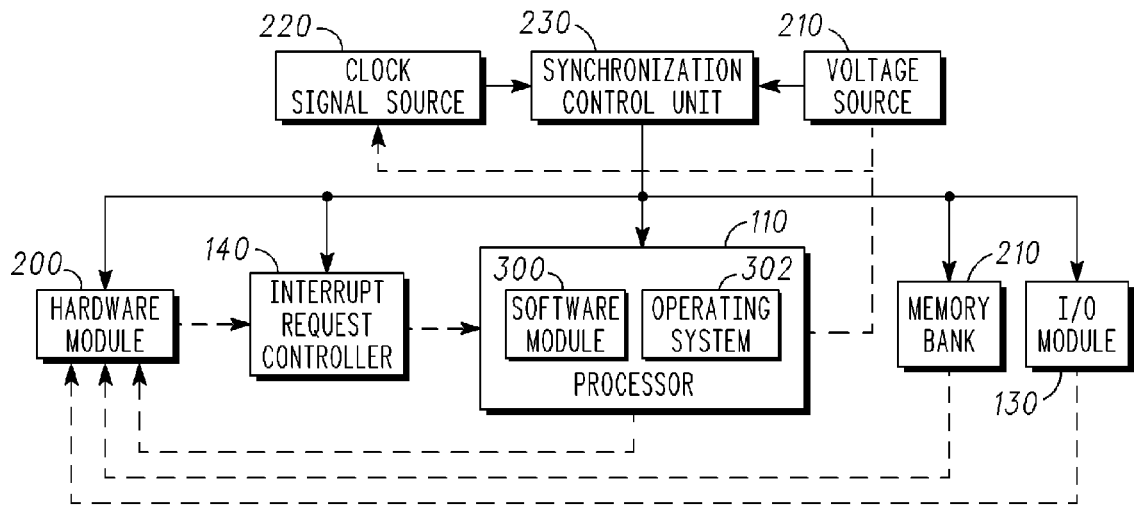
FIG. 1 is a schematic illustration of a system according to an embodiment of the invention.

FIG. 1 is a schematic illustration of a system 100 that includes multiple components such as processor 110, memory bank 120, I/O modules 130, interrupt request controller 140, clock signal source 220, voltage source 210, synchronization control unit 230. System 100 also includes a hardware module 200. Conveniently, processor 110 executes a software module 300 that with the hardware module 200 forms apparatus 232.

It is noted that system 100 can have various configurations and that the components illustrated in FIG. 1 represent only a single exemplary configuration of system 100. Typically system 100 is includes within a mobile device such as a cellular phone.

The hardware module 200 is adapted to receive one or more activity related signals representative of an activity of at least one component of the system 100 and in response determine whether to alter the voltage/frequency provided to the components of system 100. Such signals may include, for example, memory access signals (read/write), cache hit/miss signals, bus related signals, processor IDLE signal, various processor instructions, interrupt requests, I/O access, and the like.

Apparatus 232 is capable of determining the supply voltage and clock signal frequency supplied to system 100 (said characteristic pair is referred to as voltage/frequency) under various timing constraints that include, for example: the decision period of apparatus 232, voltage supply and clock signal supply stabilization period, and system's 100 and especially processor's 110 load change rate.

When the load of system 100 decreases a significant decrement of the voltage/frequency can amount in large power consumption reduction. Nevertheless, the reduction of voltage/frequency shall take into account the next (lower) voltage/frequency to supply to system 100.

When the load of system 100 increases, the voltage/frequency must be increased relatively fast in order to prevent performance penalties that are especially critical when the system 100 executes a real time program such as a video processing program.

In both cases the apparatus 232 must track the load of system 100 in a relatively fast manner but without introducing too many voltage/frequency changes.

The apparatus 232 can be adapted to apply a first policy when deciding to increase the frequency/voltage supplied to system 100 and a second policy, that conveniently differs from the first policy, when deciding to decrease the voltage/frequency supplied to system 100. It is noted that apparatus 232 can apply various policies, even the same or substantially the same policies when deciding to increase or decrease the supplied voltage/frequency.

Conveniently, applying different voltage/frequency increment and decrement policies are implemented, for example, by setting different average load thresholds (Nup and Ndown, Lp and Ldown) to various load related events. Those of skill in the art will appreciate that using the same (or substantially the same) voltage/frequency increment and decrement policies can include using the same average load thresholds, but this is not necessarily so.

Figure 2:
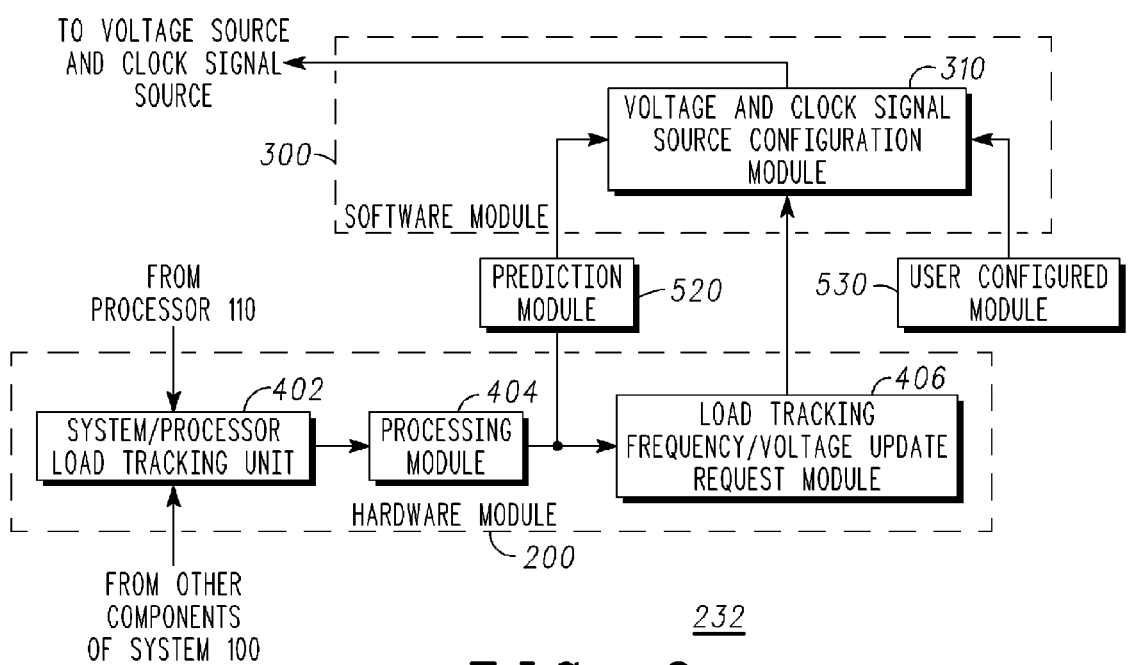
FIG. 2 illustrates an apparatus, according to an embodiment of the invention.

FIG. 2 illustrates apparatus 232, according to an embodiment of the invention.

The various tasks associated with controlling and providing voltage and clock signals to system 100 were divided between the hardware module 200 and the software module 300 of apparatus 232. The hardware module 200 receives one or usually multiple activity related signals, applies a load tracking algorithm such as but not limited to the exponential moving average (EMA) algorithm and determine when to alter the voltage/frequency supplied to system 100.

The software module 300 configures the voltage source 210 and the clock signal source 220.

Optionally, the apparatus 232 includes a prediction module 520 that predicts how to alter the voltage/frequency in response to previous exponential moving average load estimates. The hardware module 200 includes programmable components thus allowing alterations of the decision process.

The control of the voltage source 210 and clock signal source 220 is relatively simple and does not load the processor 110. Furthermore, its simplicity allows components having limited processing capabilities, such as DMA modules and simple controllers, to execute the voltage and clock signal source configuration module 310. In addition, various existing processors have the capability of setting voltage and clock signal frequency, thus utilizing this capability further increases the efficiency of apparatus 232 and system 100 as a whole.

The apparatus 232 samples the activity related signals by the clock signal CLK supplied to the system or by a clock signal having a lower frequency, such as CLK_3 that is a derivative of CLK.

Said sampling provides a more accurate load level tracking than a system that uses a real time clock that is not influenced by the changes of clock signals provided to the monitored system.

System 100 receives a supply voltage V(t) as well as a clock signal CLK of a certain frequency F(t) from a synchronization control unit 230 that synchronizes the levels of V(t) and F(t) such as to prevent, for example, a case in which the supplied voltage V(t) does not allow the system 100 to operate at a the frequency F(t) of the clock signal. The synchronization control unit 230 is connected to a clock signal source 220 for receiving the clock signal and is also connected to a voltage source 210 for receiving the supply voltage. Conveniently, the clock signal source 220 includes two phase locked loops, whereas while one is supplying a current clock signal of a current frequency the other can be tuned to supply the next clock signal having a next frequency. The voltage source can also include two voltage sources but this is not necessarily so.

Apparatus 232 includes a hardware module 200 that includes a system/processor load tracking unit 402, a processing module 404 and a load tracking frequency/voltage update request module 406. The software module 300 includes a voltage and clock signal source configuration module 310. FIG. 2 also illustrates two optional modules such as prediction module 520 and user configures module 530, each can be a hardware module, a software module or a combination of both hardware and software.

The voltage and clock signal source configuration module 310 is capable of configuring the clock signal source 220 as well as the voltage source 210 by various prior art methods, such as writing control values to registers accessed by these sources.

The voltage and clock signal source configuration module 310 is capable of receiving a requests to alter the voltage/frequency from load tracking frequency/voltage update request module 406 and to convert the request to a format that can be understood by and accessible to the clock signal source 220 as well as the voltage source 210.

Conveniently, the voltage and clock signal source configuration module 310 receives also a request to alter the voltage/frequency from a prediction module 520. According to another embodiment of the invention the voltage and clock signal source configuration module 310 is also adapted to receive requests from a user-configured module 530.

When requests can be provided to the voltage and clock signal source configuration module 310 from more that a single module it may apply various decision processes to decide how to alter the voltage/frequency. Each request can be assigned with a certain priority and/or weight and any combination of at least one of the requests can be applied. For example, a request of the prediction module 520 can override a request of the load tracking frequency/voltage update request module 406, and a request from the user-configured module 530 can override both.

System/processor load tracking unit 402 received multiple activity related signal and is capable of assigning a predefined weight to each signal. Conveniently, the system/processor load tracking unit 402 tracks the activity of the processor 100 by monitoring at least one signal such as an IDLE signal and also is also capable of tracking the activity of other components of system.

The a system/processor load tracking module 402 provides an indication of the activities of various components to a processing module 404 that outputs a load indication and an exponential moving average load estimate to the load tracking frequency/voltage update request module 406 and also provides the exponential moving average load estimate to the prediction module 520.

Figure 3:
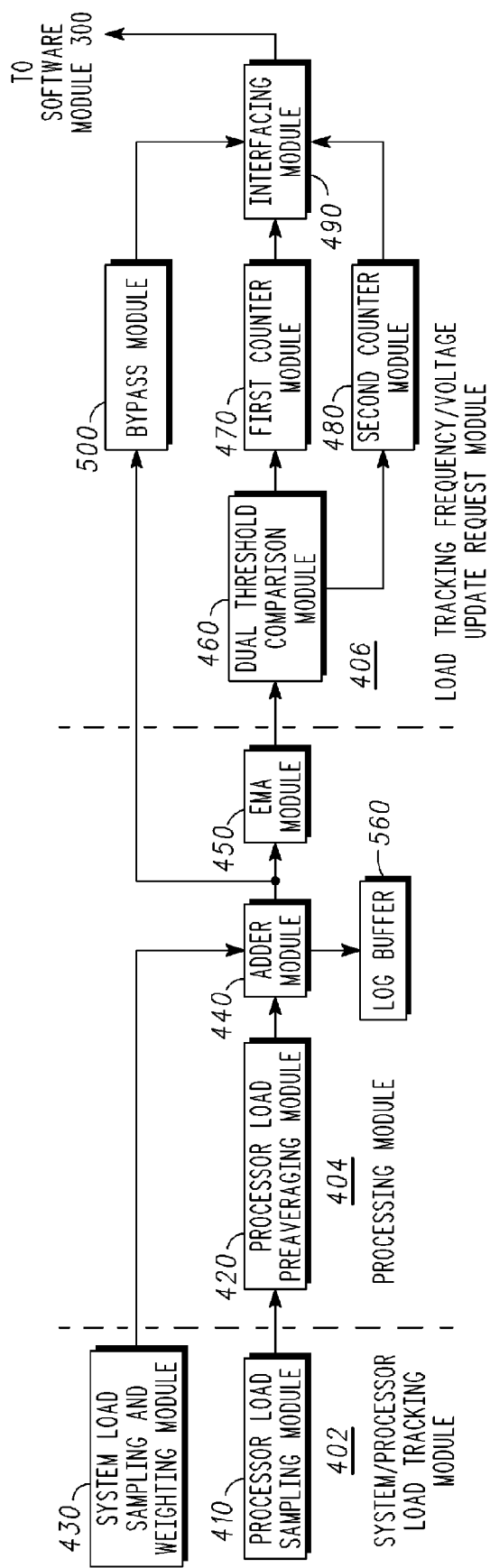
FIG. 3 is a schematic diagram of various modules of an apparatus, according to an embodiment of the invention.

FIG. 3 is a schematic diagram of various modules 402-406 of the apparatus 232, according to an embodiment of the invention.

System/processor load tracking module 402 includes modules 410 and 430. Processor load sampling module 410 samples the IDLE or NON-IDLE (BUSY) signal of processor 110. The IDLE or NON-IDLE (BUSY) signal is sampled by CLK and creates IDLE' sampled signal. Thes IDLE' sampled signal is provided to a processor load pre-averaging module 420 that belongs to processing module 404. The processor load pre-averaging module 420 calculates a ratio R between the amounts of clock signals (CLK) during a certain averaging period and between the amount of sampled signal IDLE' provided by processor load sampling module 410 during that certain averaging period. The length of the averaging period is programmable. Conveniently, either module 410 or module 420 can multiple either IDLE' or R by a programmable weight W_IDLE. Conveniently, the averaging periods do not overlap, but this is not necessarily so.

Conveniently, processor load pre-averaging module 420 also divides CLK to generate a slower clock signal CLK_3 that is provided to various modules such as modules 430 and 440-490.

System load sampling and weighting module 430 receives multiple activity related signals from other components of system 100, although it can also receive one or more signals (other than IDLE) from processor 110. The system load sampling and weighting module 430 samples the received signals by CLK_3 and multiplies each sampled activity related signal by a corresponding programmable weight to provide multiple weighted system activity related signals SL_1-SL_K.

R is also provided to a log buffer 560, and conveniently said log buffer 560 can also receive at least one of the load indication system load indication signals.

Processing module 404 includes modules 420, 440 and 450. Adder module 440 adds R to the multiple weighted system activity related signals SL_1-SL_K to provide a load indication LL(t).

The load indication LL(t) is provided to a bypass module 500 as well to a exponential moving average (EMA) module 450.

The EMA module 450 applies an exponential moving average module algorithm that is responsive to at least one programmable parameter $\alpha$. Basically, EMA performs the following equation: $EMA(t)=\alpha*LL(t)+(1-\alpha)*EMA(t-\Delta t)$, whereas EMA(t) is an exponential moving average load estimate, $\alpha=1/(W+1)$, W is a positive integer representative of an amount of samples that are taken into account within a programmable window and EMA(t–$\Delta$t) is a result of the previous iteration of an EMA calculation. Typically, $\Delta$t is responsive to CLK_3 and to an amount of clock cycles required for the calculation of EMA(t).

The inventors used an eight bit $\alpha$, but this is not necessarily so. When $\alpha$ is increased the current value of LL(t) is more dominant thus rapid changes of LL(t) can be tracked. When $\alpha$ is decreased previous samples are more relevant and a more stable tracking process is achieved.

Load tracking frequency/voltage update request module 406 includes modules 460-480.

Load tracking frequency/voltage update request module 406 is adapted to apply different voltage/frequency increment and decrement policies. These different policies are applied by setting different thresholds like Lup and Ldown as well as using two different counters for counting consecutive EMA_higher_than_Lup signals and EMA_lower_than_Ldown signals. According to another embodiment of the invention the load tracking frequency/voltage update request can apply the same (or substantially the same) policies, for example by using a single threshold instead of using a lower threshold and an upper threshold, but this is not necessarily so.

Load tracking frequency/voltage update request module 406 receives exponential moving average load estimate EMA (t) and compares it in parallel to a upper average load threshold Lup and to a lower average load threshold Ldown. Both load thresholds are programmable. Higher Lup values lead to a slower voltage/frequency update process while lower Ldown values lead to an unstable voltage/frequency update process.

Each time EMA(t) exceeds Lup the dual threshold comparison module 460 generates a EMA_higher_than_Lup signal. The EMA_higher_than_Lup signal is sent to a first counter module 470 that counts the amount of consecutive EMA_higher_than_Lup signals. The first counter module 470 generates a request to increase the voltage/frequency (Req_up(t)) if more than a programmable amount (N_up) of consequent EMA_higher_than_Lup signals were received.

Each time EMA(t) is below Ldown the dual threshold comparison module 460 generates a EMA_lower_than_Ldown signal. The EMA_lower_than_Ldown signal is sent to a second counter module 480 that counts the amount of consecutive EMA_lower_than_Ldown signals. The second counter module 480 generates a request to decrease the voltage/frequency (Req_down(t)) if more than a programmable amount (N_down) of consequent EMA_lower_than_Ldown signals were received.

Req_up(t) and Req_down(t) signals are provided to interfacing logic 490 that sets various status bits, accessible by software module 300, to reflect a received request to alter voltage/frequency. Interfacing logic can also send a request to interrupt request controller 140 (or directly to processor 110) to initiate an interrupt request that enables processor 110 to execute voltage and clock signal source configuration module 310. The voltage and clock signal source configuration module 310 converts requests to increase or decrease voltage/frequency to commands that control the clock signal source 220 and the voltage source 210 accordingly.

The bypass module 500 receives LL(t) and compares it to a predefined load threshold. If said load threshold is exceeded the bypass module 500 can send a request to increase the voltage/frequency to interfacing logic 490, regardless of the output of modules 450-480. The bypass module 500 allows the apparatus 232 to respond quickly to sudden system overload situations.

The prediction module 520 can predict power consumption based upon previously stored load indications, for example the load indications stored at the log buffer 560.

According to other embodiments of the invention the prediction module 520 can response to instructions being executed by processor 100. For example, it may predict the load when processor 110 executes loops, by monitoring various commands, flow changes an/or loop commands fetched by processor 110. The prediction module 520 can include software components, hardware components or a combination of both.

According to an embodiment of the invention the programmable values provided to the apparatus 232 can be responsive to previously provided values and even to the tasks that are executes by system 100 and especially processor 110. For example, when system 100 mainly processes video the system 100 and especially processor 110 can load a first set of programmable values to the apparatus 232, while when executing other tasks, another set of programmable values can be loaded. The programmable values can be also programmed in response to previous voltage/frequency alterations. For example very frequent voltage/frequency alterations can indicate that a slower tracking process is required and vice verse. The programmable values can also be responsive to other parameters such as operating conditions (such as temperature, battery level) of system 100 and the like.

Figure 4:
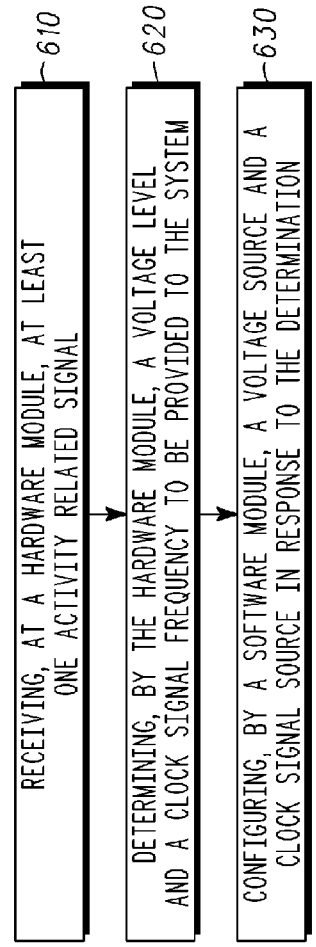

FIG. 4 is a flow chart of a method 600 for controlling voltage level and clock signal frequency supplied to a system.

Method 600 starts by stage 610 of receiving, at a hardware module, at least one activity related signal. Conveniently, stage 610 includes assigning a weight to each activity related signal.

Referring to the example illustrated by FIG. 1-FIG. 3, the processor load sampling module 410 and the system load sampling and weighting module 430 receive multiple signals representative of the activities of various components of system 100 including processor 110.

Stage 610 is followed by stage 620 of determining, by the hardware module, a voltage level and a clock signal frequency to be provided to the system.

Conveniently, stage 620 includes calculating an exponential moving average load estimate. Preferably, the exponential moving average load estimate is compared to an upper average load threshold and to a lower average load threshold. Referring to the example illustrated by FIG. 1-FIG. 3, said determination is responsive to a calculation process applied by modules 420-480. According to another embodiment of the invention the method can include applying the same (or substantially the same) voltage/frequency policies, for example by using a single threshold instead of using an lower average threshold and an upper average threshold, but this is not necessarily so.

Conveniently, stage 620 further includes comparing a load indication to a load threshold and generating a request to increase the voltage level and clock signal frequency if the load indication exceeds the load threshold. Referring to the example set forth in FIG. 1-FIG. 3, this stage can be implemented by bypass module 500.

According to an embodiment of the invention stage 620 is followed by a stage of storing load indications.

According to yet another embodiment of the invention stage 620 includes estimating future load in response to the stored load indications.

Conveniently, the hardware module applies a first policy for increasing the voltage level and clock signal frequency and a second policy for decreasing the voltage level and clock signal frequency.

Stage 620 is followed by stage 630 of configuring, by a software module, a voltage source and a clock signal source in response to the determination. According to a further embodiment of the invention method 600 includes providing the clock signal to a first portion of the hardware module and providing another clock signal of a lower frequency to a second portion of the hardware module.

Conveniently, method 600 includes programming at least one programmable parameter of the hardware module.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

The invention claimed is:

1. A method for controlling voltage level and clock signal frequency supplied to a system, the method comprising the steps of:
   receiving, at a hardware module, multiple activity related signals representative of activities of multiple components of the system;
   determining, by the hardware module, the voltage level and the clock signal frequency to be provided to the system, wherein determining the voltage level and the clock signal frequency includes calculating an exponential moving average load estimate;
   configuring, by a software module, a voltage source and a clock signal source in response to the determination;
   generating a request to increase the voltage level and the clock signal frequency to be provided to the system if an amount of consecutive comparisons in which the exponential moving average load estimate exceeds an upper average load threshold exceeds a first programmable amount; and
   generating a request to decrease the voltage level and the clock signal frequency to be provided to the system if an amount of consecutive comparisons in which the exponential moving average load estimate is below an lower average load threshold exceeds a second programmable amount.

2. The method of claim 1 wherein the hardware module applies a first policy for increasing the voltage level and the clock signal frequency and a second policy for decreasing the voltage level and the clock signal frequency.

3. The method of claim 1 comprising assigning a weight to each activity related signal.

4. The method of claim 1 wherein the exponential moving average load estimate to an upper average load threshold and to a lower average load threshold.

5. The method of claim 1 further comprising storing load indications.

6. The method of claim 5 further comprising estimating future load in response to the stored load indications.

7. The method of claim 1 further comprising providing the clock signal to a first portion of the hardware module and providing another clock signal of a lower frequency to a second portion of the hardware module.

8. The method of claim 1 further comprising programming at least one programmable parameter of the hardware module.

9. An apparatus for controlling voltage level and clock signal frequency supplied to a system, the apparatus comprising:
   a hardware module, adapted to receive multiple activity related signals representative of activities of multiple components of a system and to determine the voltage level and the clock signal frequency to be provided to the system, to calculate an exponential moving average load estimate, to generate a request to increase the voltage level and the clock signal frequency to be provided to the system if an amount of consecutive comparisons in which the exponential moving average load estimate exceeds an upper average load threshold exceeds a first programmable amount, and to generating a request to decrease the voltage level and the clock signal frequency to be provided to the system if an amount of consecutive comparisons in which the exponential moving average load estimate is below an lower average load threshold exceeds a second programmable amount; and
   a software module, adapted to configure a voltage source and a clock signal source in response to the determination.

10. The apparatus of claim 9 wherein the hardware module applies a first policy for increasing the voltage level and the clock signal frequency and a second policy for decreasing the voltage level and clock signal frequency.

11. The apparatus of claim 9 wherein the hardware module is adapted to assign a weight to each activity related signal.

12. The apparatus of claim 9 wherein the hardware module is adapted to compare the exponential moving average load estimate to the upper average load threshold and to the lower average load threshold.

13. The apparatus of claim 9 further adapted to store load indications.

14. The apparatus of claim 13 further adapted to estimate future load in response to the stored load indications.

15. The apparatus of claim 9 wherein a first portion of the hardware module operates at the clock signal frequency while a second portion of the hardware module operates at a slower clock rate.

16. The apparatus of claim 9 wherein multiple parameters of the hardware module are programmable.

* * * * *